United States Patent
Maher

(10) Patent No.: US 6,959,536 B1
(45) Date of Patent: Nov. 1, 2005

(54) FUEL PUMP METERING SYSTEM

(76) Inventor: James Maher, 44501 Louvert Ct., Novi, MI (US) 48375

( * ) Notice: Subject to any disclaimer, the term of this patent is extended or adjusted under 35 U.S.C. 154(b) by 0 days.

(21) Appl. No.: 10/432,699

(22) PCT Filed: Nov. 27, 2000

(86) PCT No.: PCT/US00/42304

§ 371 (c)(1),
(2), (4) Date: Apr. 7, 2004

(87) PCT Pub. No.: WO02/42624

PCT Pub. Date: May 30, 2002

(51) Int. Cl.[7] ............................. F02C 9/00; F02G 3/00
(52) U.S. Cl. .................. 60/39.281; 60/39.48; 60/740; 417/540; 417/568
(58) Field of Search ................... 60/39.281, 39.48, 60/740, 734; 417/540, 568

(56) References Cited

U.S. PATENT DOCUMENTS

| | | | | |
|---|---|---|---|---|
| 30,653 A | * | 11/1860 | Schuster ........................ 99/614 |
| 2,833,114 A | * | 5/1958 | Perle .......................... 60/39.281 |
| 2,836,957 A | * | 6/1958 | Fox ............................ 60/39.281 |
| 2,841,957 A | * | 7/1958 | Neal et al. ................. 60/39.281 |
| 3,046,740 A | * | 7/1962 | Satory et al. ............. 60/39.281 |
| 3,213,613 A | * | 10/1965 | Schwent et al. .......... 60/39.281 |
| 3,918,254 A | * | 11/1975 | Wernberg .................. 60/39.281 |
| 3,936,235 A | | 2/1976 | Larsen ......................... 417/279 |
| 4,205,638 A | * | 6/1980 | Vlacancinch .............. 123/46 A |
| 4,300,347 A | * | 11/1981 | Smith ....................... 60/39.281 |
| 4,430,049 A | * | 2/1984 | Aiba .......................... 417/540 |
| 4,476,675 A | * | 10/1984 | Aurousseau et al. ...... 60/39.281 |
| 4,702,070 A | * | 10/1987 | Cureton et al. .............. 60/785 |
| 4,974,571 A | | 12/1990 | Oppenheim et al. ........ 123/531 |
| 5,548,959 A | * | 8/1996 | Lechevalier ................. 60/734 |
| 5,809,771 A | * | 9/1998 | Wernberg ................ 60/39.094 |
| 6,004,127 A | | 12/1999 | Heimberg et al. .......... 431/179 |
| 6,062,831 A | * | 5/2000 | Konishi et al. ............. 417/540 |
| 6,189,312 B1 | * | 2/2001 | Smith ....................... 60/39.281 |
| 6,279,517 B1 | * | 8/2001 | Achten ....................... 123/46 R |
| 6,381,946 B1 | * | 5/2002 | Wernberg et al. ........ 60/39.281 |
| 6,619,027 B1 | * | 9/2003 | Busch ....................... 60/39.281 |
| 6,651,442 B2 | * | 11/2003 | Davies et al. ................. 60/773 |
| 6,807,801 B2 | * | 10/2004 | McCarty .................. 60/39.094 |
| 2001/0022079 A1 | * | 9/2001 | Blot-carretero et al. .. 60/39.281 |
| 2003/0033796 A1 | * | 2/2003 | Dixon ..................... 60/39.281 |
| 2003/0110775 A1 | * | 6/2003 | Wernberg ..................... 60/773 |
| 2003/0172641 A1 | * | 9/2003 | Dixon et al. ............. 60/39.281 |

* cited by examiner

Primary Examiner—William H. Rodriguez
(74) Attorney, Agent, or Firm—Raggio & Dinnin, P.C.

(57) ABSTRACT

The present invention provides a widely variable and yet precisely controlled system for metering the flow of fuel to an engine component. The present invention utilizes a plurality of solenoid activated injector valves to meter fuel into an output plenum where the fuel is accumulated to avoid pressure pulses and pressurized if necessary for introduction to the combustion chamber of a gas turbine engine. This system is particularly well suited to high pressure engine systems such as helicopter jet or turbo shaft engines.

12 Claims, 2 Drawing Sheets

FUEL PUMP METERING SYSTEM

FIELD OF THE INVENTION

Metering of fuel through the use of an electrical control unit (ECU) has long been known in the art of engine design, and, with the increase in microprocessor power, metering has become the focal point of ECU operation. Sensors are now available to measure nearly every engine parameter imaginable at nearly every part of the engine, including rotation speed, acceleration, pressure, temperature and fuel mass density. Of the variables that can be controlled, the rate of fuel introduction is the most heavily relied upon in virtually all ECU and engine design. ECUs control the fuel rate to improve fuel economy, thrust, engine life, and engine noise, among any number of other performance criteria. Thus, there is always a need for a more accurately electronically controlled fuel metering system.

The present invention is most particularly directed to use in helicopter jet or turbo shaft engines, which burn the fuel in a single chamber, as opposed to combustion engines that utilize individual combustion cylinders. Further, the fuel delivery system of jet engines requires a high pressure system, so the metering device must be operative at high pressures and compatible with components required to generate and maintain a stable high pressure fluid charge and flow. Helicopter engines also require extremely tight seals but are subjected to high levels of vibration.

Current ECUs in development have integrated intelligent adaptive control technologies such as automated modeling techniques, neural networks, and fuzzy logic. These ECUs have been called Full-Authority Digital Electronic Controls (FADEC) and can be used to monitor the health of the engine as well as to monitor sensor faults or components degradation. This diagnostic/prognostic technology can be implemented by adding additional variables to the FADEC. But still fuel metering is the most efficacious way of extending compressor or rotor life.

The most dramatic variable in terms of system demands is the recent integration of the flight control systems with the engine control system, made possible by such advanced computer controls. In order to reduce the number of variables a pilot must monitor, an ECU or FADEC can be programmed (or taught) to adjust engine output in certain flight conditions. For example, a helicopter pilot must activate a lift control with one hand and throttle-up the engine with the other to accommodate the additional lift load demand and thus avoid a droop in engine speed. The ECU or FADEC can regulate the engine speed automatically to avoid this droop upon sensing sudden activation of the lift control by increasing the metered to the fuel rate.

The demands of jet helicopters, particularly military helicopters, are particularly high. The engine capacity is quite large compared to civilian aircraft and performance standards are even higher. Components must be of the highest quality and yet must be produced in the most cost-effective manner possible. Durability, serviceability and modularity are critical so as to minimize down time and inventory. It is also important to provide system redundancy to provide a margin of safety in case of component failure. Most important, however, are the accuracy and responsiveness of the metering system. The ECU or FADEC can monitor engine conditions so precisely that fuel rate changes can occur in 0.005-second increments and require adjustments as little as +/−2–5%. Further, the fuel rate can be as low as 29 lb/hr, but must be able to be increased to 360 lb/hr. Maintaining such a level of responsiveness and accuracy of fuel metering over such a wide range is the principal need addressed by the present invention.

SUMMARY OF THE INVENTION

The present invention utilizes a plurality of electronically controlled injector valves precisely to meter fuel into an output plenum where the fuel is accumulated to avoid pressure pulses and pressurized if necessary for introduction to the combustion chamber of a gas turbine engine.

DESCRIPTION OF THE PREFERRED EMBODIMENT(S)

Figure 1:
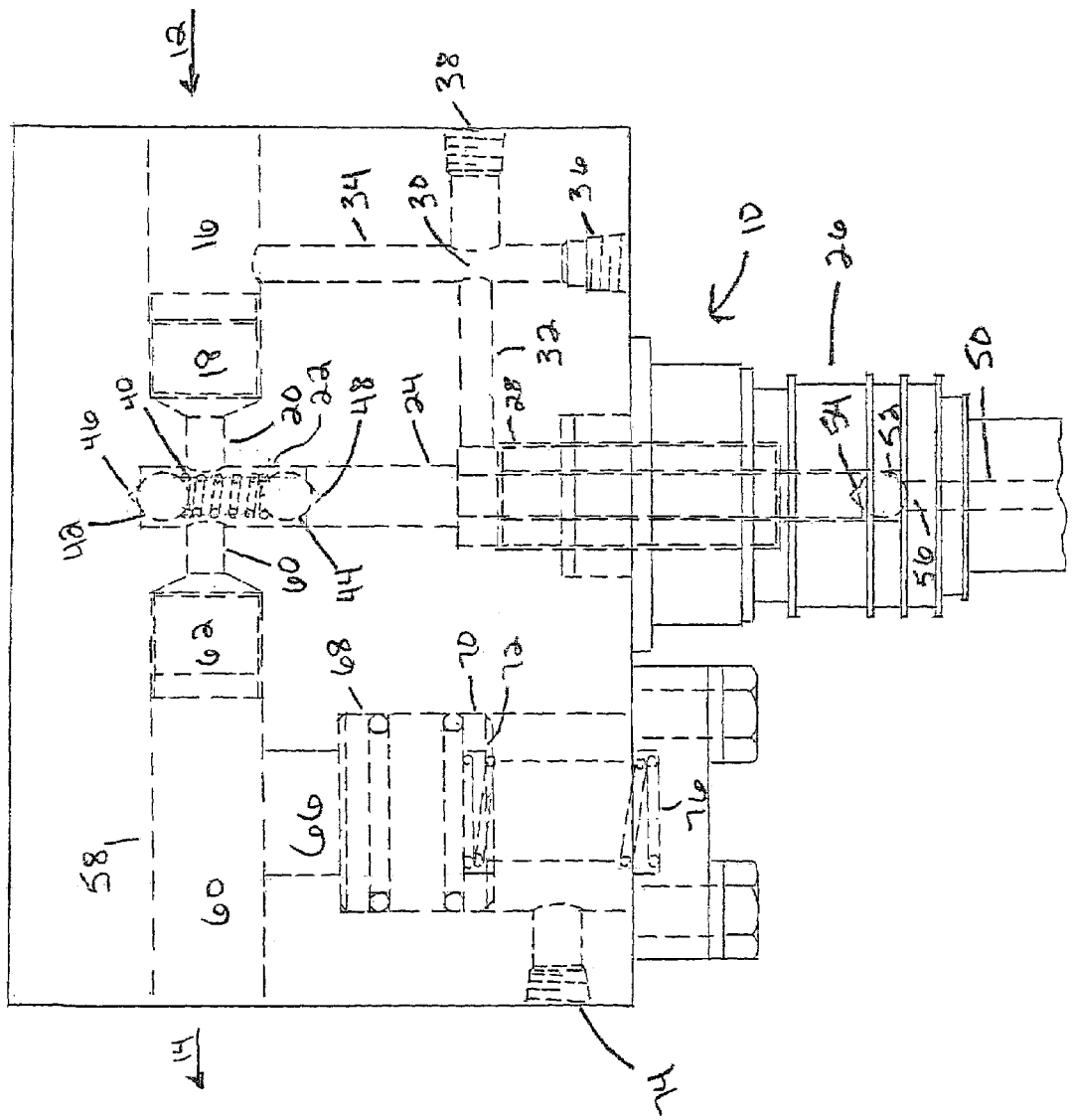
FIG. 1 is a cross sectional view of one embodiment fuel metering device according to the present invention.

FIG. 1 shows a fuel-metering device 10 according to the present invention. The fuel flow is indicated by arrow 12 from a fuel source such as a fuel tank (not shown) through the cylindrical housing 11 of the device 10, and exiting at arrow 14 to the combustion chamber of the gas turbine engine (not shown). The fuel is delivered through conduit 16, which is preferably bored into the housing 11, through inlet check valve 18. Inlet check valve 18 can be any type of check valve known in art, which is biased in a closed position in a direction opposing flow into the device. The biasing force is relatively weak such that a low pressure change will allow fuel to flow into the device 10, but biased in the direction opposing said flow such that back-flow is prevented. Fuel will flow through the inlet check valve 18 through an inlet 20 into the pump or injection chamber 22. The injection chamber 22 is preferably a cylindrical bore in said housing 11 for receiving a cylindrical push rod or plunger 24 to create a piston pump. The push rod 24 is reciprocated by an electrically controlled solenoid 26, which is preferably of the type used in marine outboard engine. Such solenoids are capable of driving the pistons at a sufficiently high frequency and while maintaining the necessary durability and reliability. While such solenoids are becoming more commonly used in marine applications, they have not been used in gas turbine engines, which require a steady fuel flow. The push rod 24 is guided by a barrel or sleeve 28 which reduces rocking and wear on the piston 24 and the chamber 22. Some small fuel leakage around the piston 24 is anticipated and acts to lubricate and cool the piston 24 and chamber 22. A drain 30 is provided to recycle such leaking fuel to the fuel source during the intake stroke. The drain 30 is preferably comprised of two bores 32 and 34 within the housing 11 capped by plugs 36 and 38.

The piston pump is preferably biased by a spring 40 toward the end of the intake stroke to restrict fuel intake when the solenoid 26 is not activated. The spring 40 is seated on ball bearings 42 and 44, which are in turn seated within seats 46, 48 in the chamber 28 and plunger 24 respectively, to maintain alignment of the spring 40 with the plunger 24. The push rod or plunger 24 acts as an extension of the solenoid plunger 50, coupled via the solenoid ball bearing 52 seated in seats 54 and 56 in the plunger 24 and solenoid plunger 50 respectively.

The solenoid is electronically controlled by an electronic controller (not shown) which can actuate the solenoid in a predetermined pattern or in response to output from a computer evaluating conditions monitored by the computer. When activated, the solenoid 26 reciprocates the piston 24. On the intake stroke, the piston draws fuel from the fuel source, overcoming the biasing force of the check valve 18. Once fuel enters the chamber 22, the output stroke will force fuel into the plenum 58, through injector outlet 60 and check valve 62. The outlet check valve 62 has a higher biasing force opposing the flow from the injector chamber 24, ensuring that there is no leakage into the combustion chamber.

The plenum 58 preferably comprises a larger bored chamber 64 with an intersecting bored resonance chamber 66. The resonance chamber has a small diameter bored area intersecting the plenum chamber 64 and a larger diameter bored area 70 containing a resonance piston 72. The resonance piston 72 separates the resonance chamber, and is actuated via pressure inlet 74, which is connected to the compressor discharge pressure (CDP) of the gas turbine engine. As the gas turbine speeds up, CDP increases. Since the compressor discharges into the combustor (where the fuel is burned), the pressure in the combustor (and hence in the fuel line to the combustor) increases at the same rate as CDP. Venting CDP to the back of the resonator piston 72 compensates for pressure increases in the fuel due to higher engine speeds. When the injector fires, part of the fuel it ejects stays in the plenum 64 and pushes the resonator piston 72 back. Then, after the injector has fired, the resonator piston 72 drives that fuel out of the plenum 64. This tends to reduce the pulsing fuel flow typical of a fuel injection system. The resonance piston 72 is also biased toward the plenum chamber 68 by spring 76, which primarily acts to push fuel out when the injector is not firing.

It should be appreciated that it is anticipated that a plurality of metering devices 10 will be utilized, all electronically controlled in response to engine conditions being monitored or even anticipated. Thus, a computer can precisely regulate fuel flow in response to pilot steering and thrust control as well as automatically compensate for engine conditions. A key to the multiple injector system is redundancy, so that the computer can increase injector rates to remaining injectors should one or more injectors fail. The computer can monitor individual injector function by monitoring the voltage and current to each injector. Additionally or alternatively, a flow meter can be used at the output of each plenum to monitor injector performance.

The first embodiment could alternatively be modified to utilize multiple injector pumps (22, 24) within a single housing 11 all in communication with a single plenum 58 having a resonator piston assembly as described above. A number of these multiple pump injectors could be used in combination.

A fuel metering unit utilizing solenoid driven injectors which raise the fuel pressure. Each time a fuel injector is fired, (via an electrical signal delivered at a precise time by some type of ECU, preferably a FADEC), a specific amount of fuel is delivered through the housing. The injectors are fired just often enough to deliver the exact amount of fuel required by the control unit. The injectors are preferably fired many times per second, thus minimizing the pressure variation experienced in the injector line due to fuel discharge. Further, the fuel discharge is distributed among many injectors, thus minimizing the local effect of the fuel pressure in the line. The injectors increase the pressure of the fuel when discharged into the output plenum. This would reduce or eliminate the need for additional pressure boosting devices (such as a pump).

In each of the described embodiments, the plurality of injectors can be sequentially or even simultaneously actuated, providing a very large range of metered flow, which is particularly important for occasions requiring very large fuel flow for a sudden boost in thrust—such as combat conditions for armed military helicopters. The plurality of injectors also provides a level of redundancy such that multiple injectors could fail and the system could still function within specifications. The use of multiple injectors also reduces the metering time required to meter a given amount of fuel, compared to using fewer injectors, without sacrificing the accuracy of the metering.

These solenoid-powered injectors may be of any commercially available variety, such as those currently in use on some marine outboard applications. They may also be custom-designed for this application. It may be necessary to boost the force provided by the solenoid with pressurized air from the turbine s compressor, This would be accomplished by opening a vent from the compressor just as the solenoid fires. The compressed air would press on the face of a piston, which will apply additional force to the unit s plunger.

This metering system is particularly useful in light of the added capabilities of new ECUs which can monitor the condition of components and monitor various parameters such as fuel pressure and temperature at various points within the system. Voltage and current information from each injector can be processed by an ECU and compared to the nominal or expected values, and can thus monitor the condition of the injector and modify the control strategy to account for problems with any of the injectors.

Alternate types of fluid pressure shock absorbers could also be used, such as diaphragms or the like. It is further contemplated that the plenum could have an enlarged cross section at its distal end to reduce the effects of pressure spikes and could have a baffle near its outlet to reduce transmission of any pressure spikes to the combustion injector.

Figure 2:
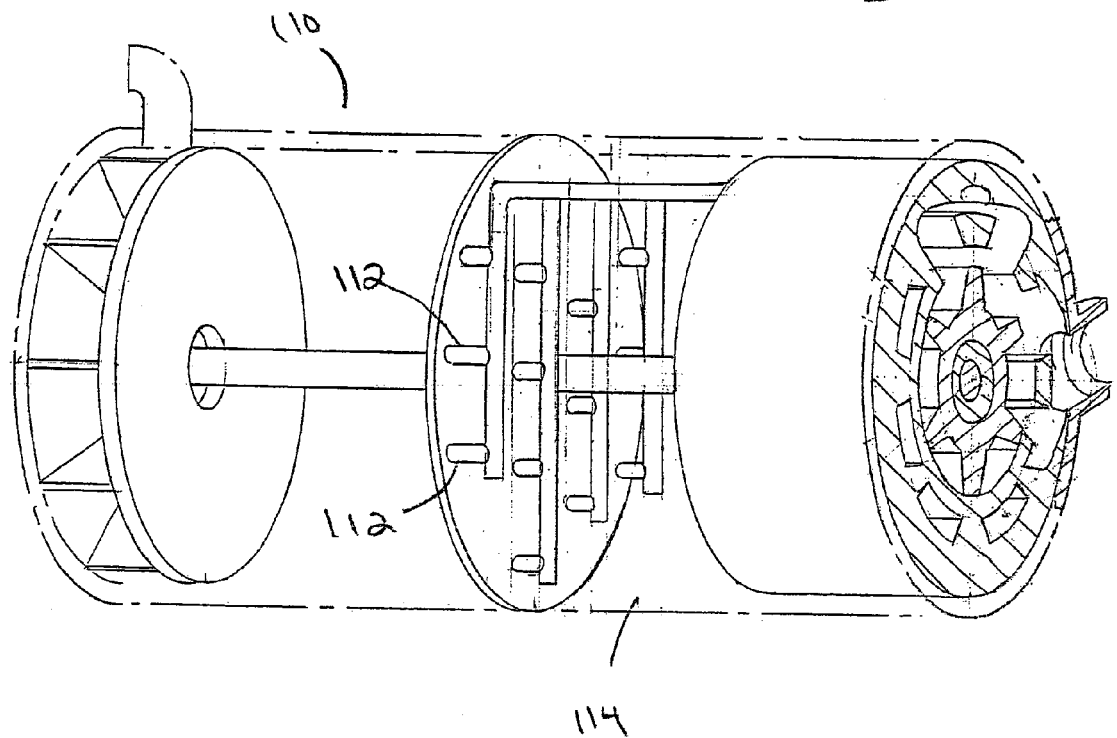
FIG. 2 is a diagrammatic view of a second embodiment of the present invention.

An alternate embodiment of the present invention is diagrammatically shown in FIG. 2. Generally, this embodiment of a metering device 110 utilizes a plurality of diesel injectors 112 which meter fuel into a common plenum 114. The injectors 112 are electronically controlled as described above, and are commercially available. As described above, the plurality of injectors provides redundancy that can adjust for malfunctioning injectors without any loss of performance. The injectors may be of any commercially available variety, but are preferably of the sort of electronically controlled diesel injectors commercially available, as such injectors are designed for higher pressures compared to standard automotive grade injectors.

Figure 3:
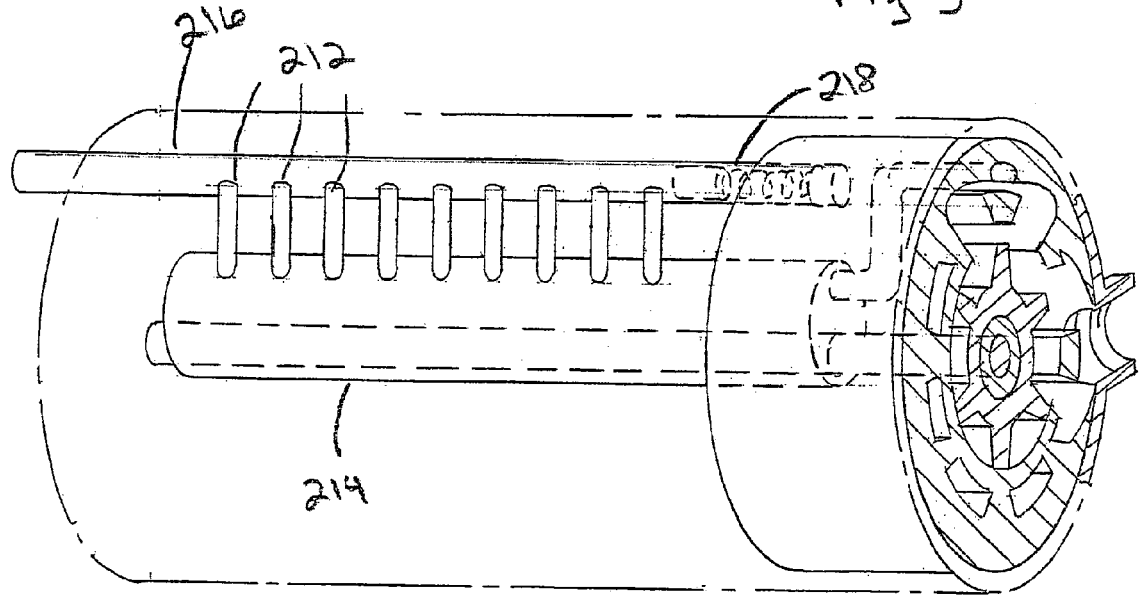
FIG. 3 is a diagrammatic view of a third embodiment of the present invention.

An additional contemplated embodiment of the metering system 210 is shown in FIG. 3, and utilizes cam driven injectors 212, which results in higher fuel pressure. The fuel is delivered through the cam housing 214 and the injectors are cam driven by the drive shaft as is well known in the art. Control of the injectors is still accomplished as described above, but the driven injectors increase the pressure of the fuel when discharged into the output plenum 216. The plenum 216 preferably has a resonating assembly 218 similar to those discussed above with respect to the first embodiment. Fuel flow is adjusted by adjusting the amount of fuel injected each time the injector fires, as is commonly done on large diesel engines.

What is claimed is:

1. A fuel metering device for varying the supply of fuel from a fuel source to a gas turbine engine comprising:
   an inlet in fluid communication with said fuel source;
   an injector outlet;
   a first chamber in fluid communication with said inlet and said outlet;
   a solenoid activated plunger reciprocal within said first chamber between a first position and a second position, wherein movement of said plunger toward said first position draws fuel into said first chamber through said inlet and movement of said plunger toward said second position causes fluid in said first chamber to flow through said outlet;
   a plenum in fluid communication with said injector outlet and a resonator chamber, said plenum having a fuel outlet;
   said resonator chamber having a first compartment and a second compartment separated by a piston, said first compartment in fluid communication with said plenum and said second compartment in fluid communication with compressed air from said turbine engine; and
   an electronic controller selectively regulating the rate said solenoid activates said plunger.

2. A fuel metering device for varying the supply of fuel from a fuel source to a gas turbine engine comprising:
   an inlet in fluid communication with said fuel source;
   an injector outlet;
   a first chamber in fluid communication with said inlet and said outlet;
   a solenoid activated plunger reciprocal within said first chamber between a first position and a second position wherein movement of said plunger toward said first position creates suction causing fuel to flow into said first chamber through said inlet, and movement of said plunger toward said second position causes fluid in said first chamber to flow through said outlet;
   a second chamber in fluid communication with said injector outlet, with a resonator chamber, and with a fuel outlet; and
   said resonator chamber having a first compartment and a second compartment separated by a piston, said first compartment in fluid communication with said second chamber and said second compartment in fluid communication with compressed air from said turbine engine.

3. The device of claim 2 further comprising a one way valve between said inlet and said fuel source biased to restrict flow from said inlet to said fuel source.

4. The device of claim 2 further comprising a one way valve between said outlet and said first chamber biased to restrict flow from said outlet to said first chamber.

5. The device of claim 2 further comprising a fuel drain connecting said first chamber to said fuel source.

6. The device of claim 2 further comprising mechanical biasing means, biasing said plunger toward said first position.

7. The device of claim 2 further comprising mechanical biasing means, biasing said plunger toward said second position.

8. The device of claim 2 further comprising mechanical biasing means biasing said piston toward said first compartment.

9. A fuel metering device for a gas turbine engine comprising:
   an electrically actuated piston pump for selectively pumping fuel into a plenum having a reservoir;
   control means for selectively electrically controlling said piston pump;
   a piston reciprocal within and sealing said reservoir, said piston reciprocal in response to air flowing from said gas turbine engine.

10. The device of claim 9 further comprising a plurality of electrically actuated piston pumps selectively controlled by said control means.

11. The device of claim 9 wherein at least two of said plurality of electronically actuated piston pumps pump fuel into a common plenum.

12. A fuel metering device for a gas turbine engine comprising:
   a plurality of electric solenoid actuated injectors for selectively pumping fuel into a plenum having a reservoir;
   control means for selectively electrically controlling a piston pump;
   a piston reciprocal within and sealing said reservoir, said piston reciprocal in response to air flowing from said gas turbine engine.

* * * * *